United States Patent [19] — Neal et al.
[11] 3,972,357
[45] Aug. 3, 1976

[54] MOBILE DELIMBING AND SLASHING MACHINE

[75] Inventors: Robert Arthur Neal; Guy Savard, both of Doaktown; Ronald Joseph Brodeur, Red Bank, all of Canada

[73] Assignee: Neal & Savard Forest Products Ltd., Doaktown, Canada

[22] Filed: June 20, 1975

[21] Appl. No.: 588,631

[30] Foreign Application Priority Data
Apr. 17, 1975 Canada................................ 224873

[52] U.S. Cl................................. 144/3 D; 83/203; 83/928; 144/2 Z; 144/312
[51] Int. Cl.²........................................ A01G 23/08
[58] Field of Search................. 144/2 A, 3 D, 34 R, 144/34 E, 309 AC, 208 R, 208 E, 312; 83/203, 928

[56] References Cited
UNITED STATES PATENTS

| | | | |
|---|---|---|---|
| 3,285,305 | 11/1966 | Nicholson | 144/208 R |
| 3,414,027 | 12/1968 | Larva, Sr. et al | 144/3 D X |
| 3,455,352 | 7/1969 | Sanders et al. | 144/3 D |
| 3,529,639 | 9/1970 | Herolf | 144/208 R X |
| 3,642,041 | 2/1972 | Hamilton et al. | 144/309 AC |

Primary Examiner—Othell M. Simpson
Assistant Examiner—W. D. Bray
Attorney, Agent, or Firm—Burns, Doane, Swecker & Mathis

[57] ABSTRACT

A machine for handling, delimbing and slashing felled trees, including hardwood trees, including a first crane for lifting a tree and inserting it into delimbing apparatus comprising an array of helically bladed cylindrical rotating delimbing augers with their axes disposed at right angles to the travel path of the tree, an array of convex bladed drawing rolls for drawing the tree through the delimbing apparatus, a saw for slashing the tree into predetermined lengths, tiltable tables for supporting the cut logs and removing them from the machine, racks for temporary storage of the cut logs, movable butt plates for predetermining different lengths into which the tree may be cut, and a second crane for handling the cut logs. The said components are mounted on a generally rectangular mobile frame having a raised forwardly extending portion. The augers and drawing rolls are mounted on members disposed on the underside of the forwardly extending portion of the frame, each member being capable of being opened at any time so as to release a tree being held therewithin and to allow it to drop to the ground.

27 Claims, 5 Drawing Figures

MOBILE DELIMBING AND SLASHING MACHINE

BACKGROUND OF THE INVENTION

1. Field of the Invention

This invention relates to a mobile tree harvesting machine for removing the limbs from ("delimbing") a felled tree and cutting it into lengths ("slashing") it). The machine may include means for cutting the delimbed tree into a number of logs of different predetermined lengths, means for sorting the cut logs according to length and means for either stacking them or loading them onto a vehicle for removal. The machine of this invention is applicable to both hardwood and softwood trees.

2. Description of the Prior Art

Many prior art devices exist that perform on softwood trees one or more of the operations performed by the machine of this invention. However, no prior art device is known to the inventors that performs all of the operations of the machine of this invention on both hardwood and softwood trees. In addition, no prior art device is known to the inventors that provides means for severing the delimbed tree trunks into different predetermined lengths. This is not surprising, as the prior art in this field relates to machines for delimbing and slashing softwood, which is normally cut into only one length (8 feet) and is used for pulpwood. However, where a machine is adaptable to delimbing both hardwood and softwood trees, the capability of cutting different lengths is desirable, because of the different uses to which the cut logs will be put depending on their size, quality and composition. For prior art machines that perform some, but not all, of the functions of the machine of this invention, see, for example: (a) U.S. Pat. No. 3,529,639 (Herolf) — means for handling, delimbing and slashing softwood trees; (b) U.S. Pat. No. 3,550,653 (Gauthier et al) — means for slashing, sorting and stacking delimbed tree trunks; (c) Canadian Pat. No. 645,245 (Bombardier) — means for delimbing and slashing softwood trees; (d) Canadian Pat. No. 803,278 (Sanders) — means for handling, slashing and storing delimbed tree trunks; (e) U.S. Pat. No. 3,500,882 (Tanguay) — means for handling, slashing and discharging delimbed tree trunks.

SUMMARY OF THE INVENTION

The delimbing and slashing machine of this invention consists essentially of a mobile frame having a forward and rearward end, said frame being provided with a raised and forwardly projecting frame member at its forward end, delimbing and tree drawing means mounted beneath the raised and forwardly projecting frame member, means for handling a felled hardwood or softwood tree and inserting it, severed end first, through the delimbing means, means for supporting the delimbed portion of the tree upon the frame and means for severing the delimbed portion of the tree from the remaining portion. The delimbing means and drawing means are adapted to release, at any time, a tree held therewithin, and allow it to drop to the ground for removal from the immediate vicinity of the machine. Preferably, the machine includes means for handling the delimbed and slashed logs, including stacking them or loading them onto vehicles, means for predetermining one or more different lengths into which the tree may be cut, and means to sort the cut logs according to length. The machine includes a suitable power source and controls. The design, construction and operation of the individual components of the preferred embodiment of the machine are more particularly described below.

BRIEF DESCRIPTION OF THE DRAWINGS

In drawings which illustrate an embodiment of the invention.

The drawings are highly schematic and do not purport to constitute a precise representation of the machine. Many conventional features are represented in a highly schematic and imprecise manner, or, for clarity and simplicity, are eliminated altogether. However, the essential features of the invention are depicted and described in sufficient detail so that one skilled in the art may produce a machine through the application of ordinary skills.

DESCRIPTION OF THE PREFERRED EMBODIMENT

Figure 1:
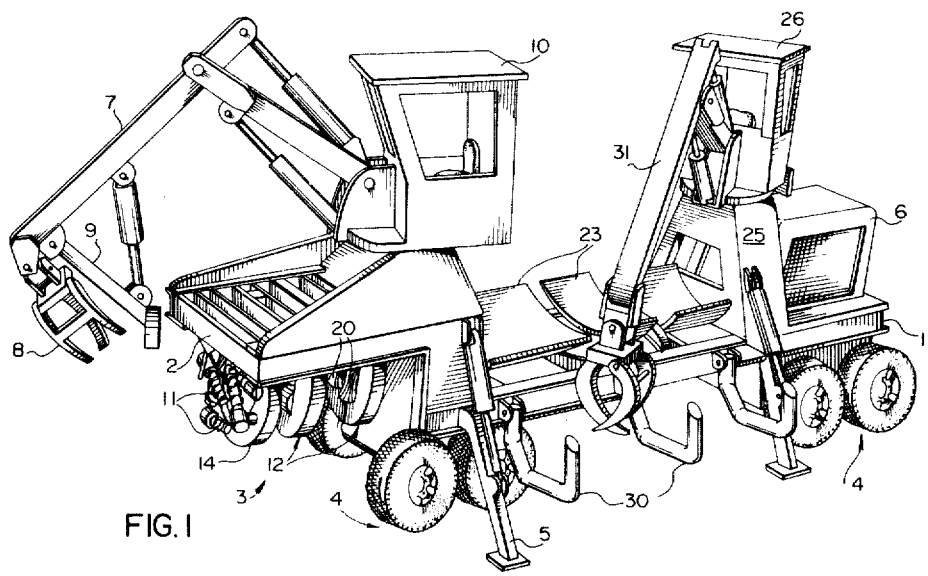
FIG. 1 is a perspective view of the machine taken from a position slightly to the front and to one side of the machine.
Figure 2:
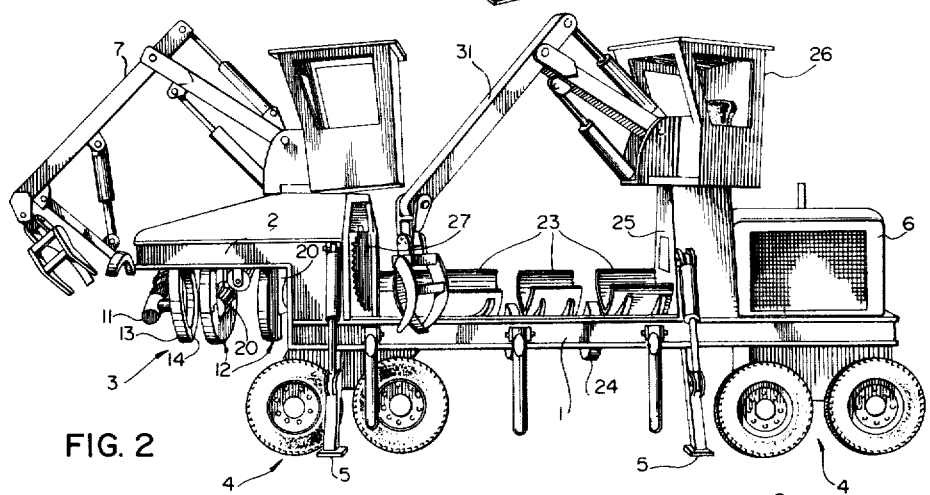
FIG. 2 is a perspective view taken directly from the same side of the machine as FIG. 1.
Figure 3:
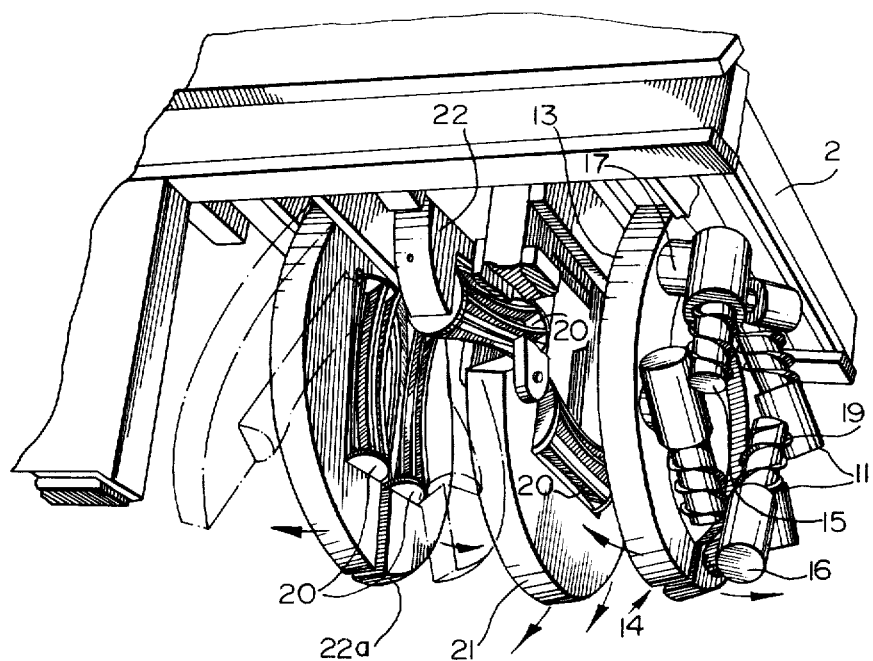
FIG. 3 is a perspective view of the drawing and delimbing apparatus of the machine, with portions cut away; it appears out of order, on the second page of the drawings.

In the embodiment of the delimbing and slashing machine of this invention that is shown in the Figures, the machine incorporates a generally rectangular main frame 1 having a raised and forwardly extending portion 2 that supports the drawing and delimbing means, generally indicated at 3 in FIGS. 1 and 2, and depicted in detail in FIG. 3. (In this specification, the end of the machine that includes the raised extension 2 will be referred to as its "forward" end, and the other end will be referred to as its "rearward" end).

The main frame 1 is mounted on four sets of wheels 4. It is provided with four hydraulically actuated jacks 5 that are adapted to raise, level and stabilize the main frame in position for its delimbing and slashing operations. The machine is powered by a power plant 6 located at its rearward end. The power plant is preferably a diesel engine. The machine is preferably adapted to be self-propelled by the said engine, permitting the machine to be driven to the logging site and suitably positioned thereat. Alternatively, the machine may be towable. The power plant 6 is adapted to power the various operative components of the machine, which are described below. Preferably, the power plant 6 is coupled to and drives the operative components of the machine by means of an hydraulic pressure system of a conventional type.

The machine is provided with a first hydraulically operated loading crane 7 of a conventional type. The crane terminates in a conventional clam 8 having hydraulically actuated jaws (actuators not shown) for grasping a felled tree. The crane is provided with a heel boom or ram 9, also hydraulically actuated, for controlling the position of a tree and counterbalancing the weight of its crown. The crane is of a type known in the art; see, for example, FIG. 1 of U.S. Pat. No. 3,500,882 (Tanguay). The action of the crane 7 is controlled by an operator stationed in a forward cab 10. The cab 10, together with the crane 7, is rotatable about a vertical axis. The operator in forward cab 10 also controls certain other functions of the machine, as will be more particularly described below.

Figure 5:
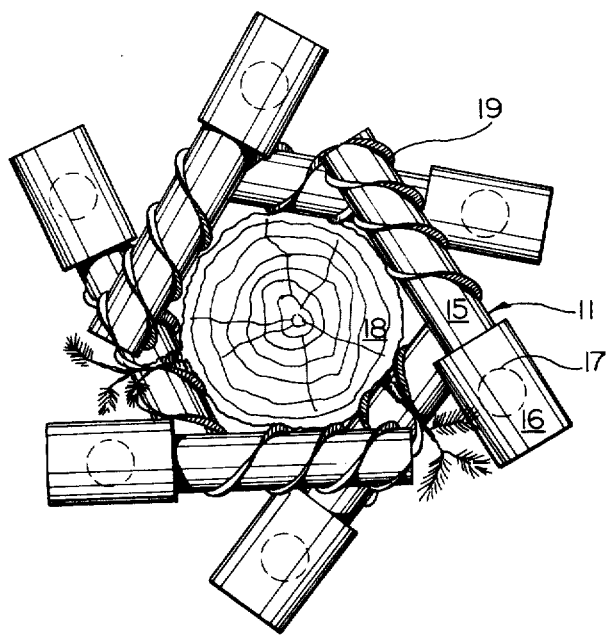
FIG. 5 is a plan view of the delimbing augers of one embodiment of this invention, showing the passage of a tree trunk through said augers.

The delimbing and drawing apparatus generally indicated at 3 is affixed to the underside of elevated forward frame extension 2. The delimbing apparatus comprises a ring-like array of augers 11 (see particularly FIGS. 3 and 5). The drawing apparatus comprises two pairs of drawing roll assemblies 12.

The use of an elevated forward frame extension, and the provision of delimbing and drawing means on the underside of the frame extension, is very important with respect to the processing of hardwood trees in particular. As will be described in further detail below, the delimbing and drawing means is adapted to open up at any time and release a tree being held within such means, so as to allow it to drop to the ground. In processing hardwood, this function will often be critical to the efficient operation of the machine. Softwood trees generally comprise a single tapering central trunk with lateral branches of decreasing size towards the top of the tree. Such trees can be easily processed in their entirety through the delimbing and drawing apparatus. On the other hand, hardwood trees tend to have large, branched crowns that would jam up in the delimbing and drawing means. In the present machine, when such jamming occurs, the tree is simply dropped, and the machine is immediately ready for the next tree. From time to time the pile of accumulated tree tops and branches beneath the drawing and delimbing apparatus can be swept aside, for example, by means of a length of tree manipulated by the forward crane 7.

The structure and function of the delimber 11 will now be described. The delimber consists of an array of cylindrical high speed augers 11 mounted on a generally ring-like supporting bracket 13. In my preferred embodiment as depicted in the figures, the supporting bracket 13 is split at its lowest point 14 and comprises two semi-circular portions that are movable with respect to each other. The direction of this movement is indicated by arrows on FIG. 3. The position of the semi-circular sections is controlled by hydraulic piston means, (not shown) whereby the sections may be spread apart from each other in order to release a tree held within the auger array and allow it to drop to the ground. As most clearly appears in FIG. 5, the augers 11 comprise rotatable cylindrical cutters 15, the shafts of which are journalled in housings 16 that are rotatably mounted on the bracket 13 by means of axes 17 extending substantially parallel to the direction of feed of a tree, i.e., parallel to the lateral members of main frame 1 and to those of frame extension 2 — see FIG. 1. Each auger is driven by a motor mounted on, or contained within, a housing 16. The axes of the cylindrical cutters 15 are maintained within a plane extending substantially at right angles to the direction of feed of a tree 13. As projected onto a plane perpendicular to the path of travel of a tree, the cylindrical cutters overlap each other so as to define a closed configuration around the space for the passage of the tree as seen in such plane. As appears in FIGS. 3 and 5, in order to allow for this overlapping relationship and resulting closed configuration, the augers are set at varying distances from the bracket 13. In the embodiment depicted in the Figures, six augers are employed, with one set of three augers being positioned farther from the bracket 13 than the other set of three augers, but other numbers and configurations of augers are possible. Generally speaking, the greater the number of augers, the closer the branches will be cut. The number of augers required in any given application of the machine depends on how closely the branches must be cut in order to permit a subsequent processing of the logs. Six is a suitable number for most applications. Where as many as six augers are present, one or more may be retracted if very small trees are to be processed.

The position of an auger is preferably controlled by hydraulic piston means (not shown) which is operative to control the rotation of a housing 16 about its axis 17. Preferably, the hydraulic pistons are set to bring the augers to bear upon the tree trunk at a predetermined pressure that provides for proper cutting of the branches while minimizing damage to the tree trunk as well as resistance to the movement of the tree through the auger assembly. The pressure is preferably controllable by the operator in cab 10, who will be able to utilize different auger pressures for different types and sizes of trees. The augers are adapted to ride in and out in accordance with irregularities in the configuration of the tree trunk, maintaining substantially constant pressure at all times. Except for the configuration of the cutting edges, the augers used in this invention may be generally similar in structure and arrangement to those known in the prior art; see, for example, Canadian Pat. No. 840,774 (Herolf) and particularly FIG. 3 thereof. However, in the augers of Canadian Pat. No. 840,774 and of a number of other patents to the same inventor, the cutting elements are rectilinear and parallel to the axis of a cylindrical cutter, which is not the case in the preferred embodiment of the present invention. The delimbing apparatus of this invention employs a cutting edge 19 that winds helically about the cylindrical cutter 15, preferably at an angle of about 30° the axis of the cylinder. The helical cutting edge 19 effects a combined slicing and shearing action, applying a force that includes a component parallel to the travel path of the tree, which component provides the slicing action, and also includes a component perpendicular to the travel path of the tree, which provides a shearing action that tends to remove the branches laterally from the tree trunk. This combined slicing and shearing action is particularly important with respect to the delimbing or hardwood, which offers substantial resistance to the slicing force. In the case of hardwood, the use of parallel cutting edges as shown in the Herolf patents would tend to cause the cutters to dig into the trunk and bind therein, causing undesirable destruction of the trunk and delays in processing. The use of the helical blade tends to reduce this binding effect. Helically bladed cutters of the general type disclosed herein are known in the softwood delimbing art. See, for example, U.S. Pat. No. 3,643,709 (McColl), and particularly FIGS. 3 and 8 thereof. However, McColl does not recognize their applicability to hardwood delimbing. McColl's "roundwood stump processor" is intended only for processing trees into pulpwood bolts.

Many other arrangements and configurations of augers may be utilized that would produce a satisfactory result. For example, the augers could be arrayed in two successive tiers, each tier being mounted on its own individual bracket, and each having, say, three or four augers. Many other alternative arrangements can no doubt be designed.

The drawing rolls 20 are preferably concave rolls having a bladed surface. The gripping effect of rolls 20 may be obtained through a series of spaced radial plates having a bladed, concave arcuate outer edge and secured to a central hub. (This is a type known in the art; see, for example, U.S. Pat. No. 3,500,882 (Tanguay) and particularly item 11 in FIGS. 8 and 9 thereof, and U.S. Pat. No. 3,550,653 (Gauthier et al.) and particularly FIG. 10 thereof.) The prior art drawing rolls referred to disclose serrated gripping edges. For the purposes of this invention, a continuous sharp bladed edge is preferred because of greater ease of maintenance, but serrated edges are undoubtedly acceptable. As shown in the Figures, there are two opposed pairs of drawing rolls 20, the first of which pairs has its axes oriented in a horizontal direction perpendicular to the travel path of the tree, and the second of which pairs has its axes oriented in a vertical direction perpendicular to the travel path of the tree. Preferably, the lower horizontal drawing roll is set somewhat ahead of the upper horizontal drawing roll in the travel path of the tree, rather than being positioned directly opposite to it. In this way, the first, lower horizontal drawing roll serves as a fulcrum about which the second, upper horizontal drawing roll may exert a downward force counterbalancing the weight of the crown of the tree. This positioning also facilitates insertion of the tree. Each of the horizontal drawing rolls is mounted in its own bracket, 21 or 22 respectively, fixed to the underside of the elevated extension of the main frame. The bracket 21 within which the first horizontal drawing roll is mounted is hinged on one side and split on the other so that the roll may be rotated away from a tree supported by it, as shown by arrows in FIG. 3, so as to allow the tree to drop to the ground. The position of the hinged portion is preferably controlled by hydraulic cylinder means (not shown). Each of the drawing rolls 20 is hydraulically actuated (by means not shown) in order to apply a substantially constant predetermined pressure upon the tree trunk, and is movable to accommodate variations in size between different tree trunks and variations and irregularities in the diameter of a given tree trunk. Each of the rolls may be driven, or alternatively, only the second horizontal roll, or the second horizontal drawing roll and one of the vertical rolls, may be driven. Other configurations and combinations of rolls, and other types of rolls, may obviously be employed to draw the tree trunk through the delimbing apparatus. Another drawing roll configuration that could find application here is one similar to that shown in Canadian Pat. No. 840,774, and particularly, FIGS. 6 and 10 thereof. Other prior art configurations could doubtless be adapted for this purpose.

In the preferred embodiment shown in the drawings, the vertical drawing rolls are supported within a ring-like bracket 22a, similar to the bracket that supports the delimbing augers. This bracket is also split at the bottom into two semicircular portions, which may be rotated away from each other so as to release a tree that is being held between the drawing rolls and allow it to drop to the ground. The position of the semicircular brackets is preferably controlled by hydraulic cylinder means (not shown). The direction of rotation of the bracket members, and their position when drawn aside, is shown in FIG. 3.

After the tree trunk has been drawn through the delimbers 11, it passes through the elevated main frame extension onto tiltable tables 23 that are pivotally mounted on the main frame 1 so as to be rotatable about horizontal axes extending parallel to the travel path of the tree. The tiltable tables 23 are preferably actuated by hydraulic cylinders (not shown). In the preferred embodiment, three separate tiltable tables 23 are provided, separated by two movable butt plates 24. The rotation of the drawing rolls 20 continues until the log either abuts against a switch mechanism (not shown) mounted on the support 25 of a second, rearward cab 26, or alternatively, at an operator's selection, against one or other of the movable butt plates 24, which may be raised or lowered at the direction of the operator in one of the cabs. The butt plates 24, like the second cab support 25, are preferably each equipped with some sort of pressure sensitive switching device that causes the rotation of the drawing rolls to cease when a log abuts against the butt plate or cab support, as the case may be. Such devices are known in the prior art; see, for example, U.S. Pat. No. 3,550,653 (Gauthier et al.), FIGS. 2 and 3, item 29.

Alternatively, a timing device dependant upon the number of rotations of the drawing rolls could be used to determine the length of trunk that has passed through the rolls, and hence the point in time at which rotation is to cease.

Figure 4:
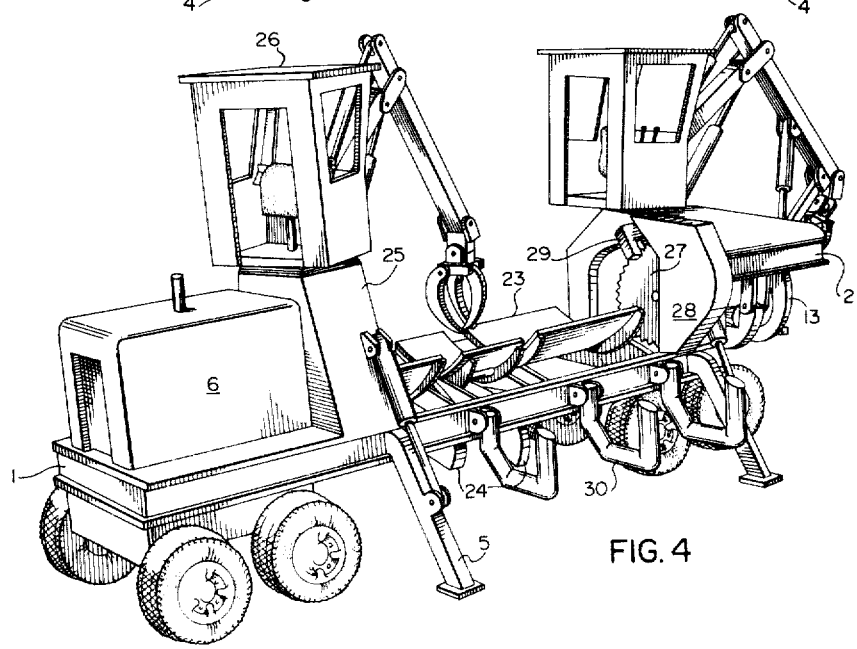
FIG. 4 is a perspective view taken from a point slightly to the rear and to the other side of the machine.

In the preferred embodiment, a circular saw 27 is provided to cut the delimbed portion of the tree from the remaining portion, thus producing a delimbed log of predetermined length. The circular saw 27 is mounted within a protective housing 28 on a pivoted saw frame 29. The circular saw blade may be continuously rotating, or it may be set to rotate only when it is pivoted across the travel path of the tree trunk so as to sever a delimbed portion thereof from the remainder of the tree. The movement of the saw 27 is preferably automatically actuated by the pressure sensitive switches in the butt plates 24 and cab support 25. Preferably, the position of the saw blade 27 is controlled by the action of a hydraulic cylinder (not shown). Retractable saw blades of the type generally described herein are known in the art; see, for example, U.S. Pat. No. 3,550,653, FIG. 4, item 28. The slashing operation may conceivably be accomplished by other means, such as a chain saw or shearing blades. In the case of hardwood trees of relatively large dimension, the use of shearing blades is probably impractical. The distances from the saw blade 27 to the movable butt plates 24 and to the end wall provided by the supporting structure 25 of secondary cab 26 are set to produce cut logs of the desired predetermined lengths. In the preferred embodiment, the distance between the saw blade and the first butt plate is eight feet, suitable for pulpwood logs, while the distances between the saw blade and the second butt plate and the distance between the saw blade and the supporting structure 25 are 12 and 16 feet, respectively, suitable for the production of hardwood or softwood logs to be used in the manufacture of lumber.

In the preferred embodiment, means is provided for sorting and temporarily stacking the logs according to length. On either side of main frame 1, storage rack members 30 are provided, three on one side of the frame, and two on the other. The rack members are hingedly mounted on frame 1 so as to be rotatable into a position above tables 23, so as not to interfere with passage of the machine on narrow logging roads in wooded areas. Their movement is preferably controlled by hydraulic cylinder means (not shown). They may be coupled to, and withdrawn or extended together with, hydraulic supports 5. If an 8 foot log is produced, the foremost of the tables 23 is tilted in the direction of the two member rack so as to deposit the log thereon. In the case of a 12 or 16 foot log, the first two, or all three, respectively, of the tiltable tables, are tilted in the direction of the three member rack so as to deposit such log thereon. In this way, 8 foot pulpwood lengths are sorted from 12 or 16 foot lumber lengths, and are temporarily stored on rack members 30 awaiting disposition. The tiltable tables may be independently operable, or alternatively, they may be set to all tilt simultaneously. A similar tiltable table and rack arrangement, used for a similar purpose, is described in U.S. Pat. No. 3,550,653 (Gauthier); see items 31 and 32 in FIGS. 1, 2 and 4 thereof.

In my preferred embodiment, an unloading crane 31 is provided. It is attached to, and controlled from, second cab 26. It is essentially similar to first loading crane 7, except that because the tree has been cut into lengths, no hydraulic ram such as that indicated by 9 is required. Second cab 26 is located between and elevated above the end of the table and the engine, at the same general level as the first cab 10. The unloading crane 31 may be used to remove logs from rack members 30 and stack them for future transport, or to load them directly onto trucks for transportation away from the logging site. Other uses of the second crane are obvious. The second cab and crane are not essential to the operability of this invention, as unloading and handling of cut logs may be accomplished by other means, such as special vehicles provided for that purpose. However, the preferred embodiment includes a second cab and an unloading crane because these features provide an essentially self-sufficient machine capable of processing felled trees into delimbed, precut, sorted and stacked groups of logs.

Preferably, the first cab operator controls all the main functions of the machine, including picking up the tree, inserting it into the delimbing and drawing apparatus, determining the length, dropping a jammed tree, controlling the movement of the saw and the tables, and controlling the pressure on the delimbers and draw rolls. Once the delimber and draw roll pressure has been set, and the tree has been inserted into the draw rolls, the processing is preferably automatic, subject to manual override from cab 10 at any time. The second cab operator is responsible for the operation of crane 31 to remove and stack the cut logs, or load them onto trucks.

The operation of the machine of this invention in a typical application will now be described. A tree (in this hypothetical case, a hardwood tree) is felled and brought to the vicinity of the machine. If there are any branches near the severed end of the tree, these are removed. There must be a sufficient length of limb-free trunk to extend through the delimbing apparatus and the drawing rolls, in order to permit of the insertion of the cut end of the tree through the delimbing apparatus and the drawing rolls. If the tree has a divided trunk, or any very large side branches worth preserving in themselves, these are severed and set aside for separate processing. When the tree is thus ready for processing, it is grasped by the clam 8 of the first crane 7 not far from its severed end, and ram 9 is abutted against the trunk so as to properly position it horizontally for insertion, and so as to counterbalance the weight of the crown. The augers 11 are retracted so as to provide an opening sufficiently large to permit the insertion of the trunk, and the drawing rolls 20 are separated, also in order to allow for insertion of the trunk. The augers, drawing rolls and saw blade are preferably continuously rotating at all times, except that rotation of the augers and drawing rolls stops when the tree is in position for slashing and while a length of trunk is being cut off and deposited on a rack. The severed end of the tree trunk is inserted through the delimbing apparatus and the two pairs of drawing rolls. The drawing rolls 20 are then hydraulically actuated so as to grip the tree with a predetermined pressure. At the same time, the augers 11 are brought to bear against the tree trunk, also with a predetermined pressure. The drawing rolls immediately begin to pull the tree through the auger assembly, thereby removing the limbs. The operator in cab 10 has determined the desired length of the final cut log, and has placed one of the butt plates 24 in position, if the desired length is less than the maximum length. The tree continues to be drawn through the augers 11 until it abutts against one of the butt plates 24 or the support structure 25 of the second cab 26. When it strikes one of the butt plates or the support structure, it activates a pressure sensitive switch that causes the drawing rolls 20 and the augers 11 to cease rotating. However, the drawing rolls 20 continue to tightly grip the tree. At this point, the rotating saw blade 24 is automatically moved through the tree trunk so as to sever the delimbed portion from that part of the tree that is still gripped by the draw rolls. When the delimbed portion of the trunk has thus been severed, one or more of the support tables 23 is tilted in whatever direction may be appropriate so as to deposit the cut log onto one or other of the sets of rack members 30. The direction of tilt is predetermined by the selection of a butt plate, which determines the length of the log. When the severed log has been removed from the tables, and they are back in their normal position, the drawing rolls and augers again being to rotate, and a further length of tree is processed. At the same time, the operator in the second cab 26 may be removing the cut log from the rack through the use of crane 31, and either stacking it beside the machine, or loading it into a truck or other conveyance for removal from the site. In this way, the whole tree is processed, length by length. If the last part of the tree to be processed is not commercially usable, or cannot be drawn through the machine, it is simply dropped by opening the delimber and drawing roll brackets, and then discarded. The tree dropping function is preferably under manual control from cab 10. By the time the processing of one tree is complete, the operator in the first cab 10 will have already picked up another tree with the first crane 7, and have it in position ready for processing.

The invention has been described with particular reference to the preferred embodiment as shown in the drawings, but it is obvious that, as noted herein, and otherwise, many variations are possible within the scope of this invention.

We claim:

1. A mobile delimbing and slashing machine comprising in combination: a mobile main frame with a raised frame extension at the forward end thereof; delimbing means mounted on the underside of the frame extension at the forward end thereof for delimbing a felled tree; drawing roll means mounted on the underside of the frame extension adjacent to and rearwardly of the delimbing means and adapted to engage the tree and draw it through the delimbing means to delimb the same; the delimbing and drawing roll means being adapted to be opened so as to release a tree held therewithin; cut-off means mounted on the main frame adjacent to and rearwardly of the drawing roll means and adapted to cut the delimbed tree into lengths; at least two tiltable tables positioned adjacent to and rearwardly of the cut-off means so as to support a cut-off length of tree; means to pick up and feed a felled tree through the delimbing means to the drawing rolls; said delimbing means consisting of an array of cylindrical high speed rotary bladed augers mounted on a ring-like bracket disposed in a plane substantially perpendicular to the travel path of a tree moving through the drawing rolls and onto the tiltable tables; at least one pivoted stop-plate mounted on the frame between a pair of tiltable tables, said stop-plate being adapted to be selectively placed in a raised position between said tables to impede passage of a tree trunk through the machine, so as to facilitate in predetermining the length of severed portions thereof; and means for driving and controlling all the operative means of the machine.

2. The invention defined in claim 1 wherein the augers have helical cutting edges, the cylindrical axes of the augers extend at substantially right angles to the travel path of a tree, and the augers, when in delimbing position, define, in projection onto a plane perpendicular to the travel path of a tree, a closed polygon surrounding said travel path.

3. The invention defined in claim 2 in which the drawing roll means comprises a horizontal and a vertical pair of concave bladed rolls, the horizontal pair being positioned forwardly of the vertical pair and the lower roller of the horizontal pair being positioned forwardly of the upper roller.

4. The invention defined in claim 3 further including rack means mounted on the main frame for temporary storage of delimbed and severed tree lengths, and means for manipulating said severed tree lengths.

5. The invention defined in claim 4 wherein the means to pick up and feed a felled tree comprises a first crane operated from a forward cab mounted on the main frame, and the means to manipulate the severed tree lengths comprises a second crane operated from a rearward cab mounted on the main frame.

6. The invention defined in claim 5 in which the drive means for the delimbing means, drawing roll means, cut-off means, tiltable table means and first and second cranes, consists of hydraulic actuators supplied by hydraulic pressure means deriving its power from a motor mounted on the main frame, and wherein the cut-off means comprises a circular saw mounted for reciprocal movement across the travel path of a tree.

7. The invention defined in claim 6 in which the frame is provided with hydraulically actuated extendible legs to make contact with the ground for the purpose of stabilizing the frame during operations.

8. In a mobile machine for delimbing and slashing a felled tree, said machine having a main frame, the improvement comprising: a raised and forwardly extending frame portion attached to said main frame at the forward end thereof, with delimbing means and drawing roll means for drawing a tree through said machine supported on a delimbing frame and at least one drawing roll frame, respectively, said delimbing frame and said drawing roll frame being attached to, and depending from the underside of, said forwardly extending frame portion, said delimbing frame and each said drawing roll frame comprising a plurality of separable sections, at least one of which is adapted to be moved away from another of said sections in a plane substantially perpendicular to the travel path of a tree moving through the machine, so as to release said tree and allow it to drop away therefrom.

9. The invention defined in claim 8 wherein the delimbing means consists of an array of at least three cylindrical high speed rotary augers mounted on a generally ring-like delimbing frame, said delimbing frame being disposed in said plane.

10. The invention defined in claim 9 wherein: each auger has a cutting edge in the form of a helix wound about its auger cylinder; the cylindrical axis of each auger lies in a plane that extends substantially perpendicularly to the travel path of a tree moving through the machine; and the augers, when in delimbing position, define, in projection onto said plane, a closed rectilinear figure surrounding said travel path.

11. The invention defined in claim 9 wherein the generally ring-like delimbing frame is divided into two sections which are adapted to be drawn away from each other in the plane of said ring-like frame member so as to release said tree.

12. The invention defined in claim 8 wherein the drawing roll means comprises a horizontal pair and a vertical pair of bladed concave rolls, the horizontal pair being positioned forwardly of the vertical pair and the lower roll of the horizontal pair being positioned forwardly of the upper roll.

13. The invention defined in claim 12, wherein the augers are rotatably mounted on axes extending from the auger frame member, said axes being substantially parallel to said travel path, and further including means to resiliently bias said augers against the trunk of said tree with a substantially constant selected pressure, whereby said augers are adapted to accommodate themselves to variations in the diameter and/or shape of said tree trunk, and also further including means to resiliently bias the drawing rolls against said tree trunk with a substantially constant selected pressure, whereby said drawing rolls are adapted to accommodate themselves to variations in the diameter and/or shape of the tree trunk.

14. The invention defined in claim 11 wherein the drawing roll means comprises a horizontal pair and a vertical pair of bladed concave rolls, the horizontal pair being positioned forwardly of the vertical pair and the lower roll of the horizontal pair being positioned forwardly of the upper roll.

15. The invention defined in claim 4 wherein the augers are rotatably mounted on axes extending from the auger frame member, said axes being substantially parallel to said travel path, and further including means to resiliently bias said augers against the trunk of said tree with a substantially constant selected pressure, whereby said augers are adapted to accommodate themselves to variations in the diameter and/or shape of said tree trunk, and also further including means to resiliently bias the drawing rolls against said tree trunk with a substantially constant selected pressure, whereby said drawing rolls are adapted to accommodate themselves to variations in the diameter and/or shape of the tree trunk.

16. The invention defined in claim 15 wherein: each auger has a cutting edge in the form of a helix wound about its auger cylinder; the cylindrical axis of each auger lies in a plane that extends substantially perpendicularly to the travel path of a tree moving through the machine; and the augers, when in delimbing position, define, in projection onto a plane perpendicular to the said travel path, a closed rectilinear figure surrounding said travel path.

17. A mobile machine for delimbing and slashing a felled tree, comprising, in combination: a mobile main frame with a raised and forwardly extending frame portion at the forward end thereof; delimbing means supported on a delimbing frame mounted on the underside of the frame portion at the forward end thereof; drawing roll means supported on at least on drawing roll frame mounted on the underside of said frame portion adjacent to and rearwardly of the delimbing means and adapted to engage a tree and draw it through the delimbing means to delimb the same; the delimbing means and drawing roll means comprising a plurality of separable sections, at least one of which is adapted to be moved away from another of said sections in a plane substantially perpendicular to the travel path of a tree moving through the machine, so as to release said tree and allow it to drop away therefrom; cut-off means mounted on the main frame adjacent to and rearwardly of the drawing roll means and adapted to cut the delimbed tree into predetermined lengths; at least one tiltable table positioned adjacent to and rearwardly of the cut-off means so as to support a cut-off length of delimbed tree; means to pick up and feed a felled tree through the delimbing means to the drawing roll means; and means for driving and controlling all the operative components of the machine.

18. The invention defined in claim 17 wherein: the delimbing means consists of an array of at least three cylindrical high speed rotary augers mounted on a generally ring-like frame; said delimbing frame is disposed in said plane; and said delimbing frame is divided into two sections which are adapted to be drawn away from each other in the plane of said delimbing frame so as to release said tree.

19. The invention in claim 18 wherein: each auger has a cutting edge in the form of a helix wound about its auger cylinder; the cylindrical axis of each auger lies in said plane; and the augers, when in delimbing position, define, in projection onto a plane perpendicular to the said travel path, a closed rectilinear figure surrounding said travel path.

20. The invention defined in claim 19 wherein the generally ring-like delimbing frame is divided into two sections which are adapted to be drawn away from each other in the plane of said ring-like frame member so as to release said tree.

21. The invention defined in claim 20 wherein the augers are rotatably mounted on axes extending from the auger frame member, said axes being substantially parallel to said travel path, and further including means to resiliently bias said augers against the trunk of said tree with a substantially constant selected pressure, whereby said augers are adapted to accommodate themselves to variations in the diameter and/or shape of said tree trunk, and also further including means to resiliently bias the drawing rolls against said tree trunk with a substantially constant selected pressure, whereby said drawing rolls are adapted to accommodate themselves to variations in the diameter and/or shape of the tree trunk.

22. The invention defined in claim 18 wherein: there is more than one tiltable table; there is at least one pivoted stop-plate mounted on said main frame between an adjacent pair of said tiltable tables, said stop-plate being adapted to be selectively placed in a raised position between said tables to impede passage of a tree trunk through the machine; and means is provided to actuate the cut-off means when said tree trunk reaches a raised stop-plate.

23. The invention defined in claim 21 wherein: there is more than one tiltable table; there is at least one pivoted stop-plate mounted on said main frame between an adjacent pair of said tiltable tables, said stop-plate being adapted to be selectively placed in a raised position between said tables to impede passage of a tree trunk through the machine; and means is provided to actuate the cut-off means when said tree trunk reaches a raised stop-plate.

24. The invention defined in claim 23 further including: rack means mounted on the main frame for temporary storage of delimbed and severed tree lengths and means for manipulating said severed tree lengths.

25. The invention defined in claim 24 wherein the means to pick up and feed a felled tree comprises a first crane operated from a forward cab mounted on the main frame, and the means to manipulate the severed tree lengths comprises a second crane operated from a rearward cab mounted on the main frame.

26. The invention defined in claim 25 wherein the drive means for the delimbing means, drawing roll means, cut-off means, tiltable table means and first and second cranes, consists of hydraulic actuators supplied by hydraulic pressure means deriving its power from a motor mounted on the main frame, and wherein the cut-off means comprises a circular saw mounted for reciprocal movement across the travel path of a tree.

27. The invention defined in claim 26 wherein the frame is provided with hydraulically actuated extendible legs adapted to make contact with the ground for the purpose of stabilizing the frame during operations.

* * * * *